(12) United States Patent
Tomiyasu et al.

(10) Patent No.: US 10,481,851 B2
(45) Date of Patent: Nov. 19, 2019

(54) IMAGE FORMING APPARATUS, PRINTING METHOD, AND NON-TRANSITORY RECORDING MEDIUM FOR STORING COMPUTER READABLE PROGRAM

(71) Applicant: KONICA MINOLTA, INC., Chiyoda-ku, Tokyo (JP)

(72) Inventors: Kazuhiro Tomiyasu, Toyokawa (JP); Hiroaki Sugimoto, Nagoya (JP); Tomoko Maruyama, Toyokawa (JP); Kazuaki Kanai, Hino (JP); Yusuke Shinosaki, Amagasaki (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/657,394

(22) Filed: Jul. 24, 2017

(65) Prior Publication Data
US 2018/0032296 A1 Feb. 1, 2018

(30) Foreign Application Priority Data

Aug. 1, 2016 (JP) .................................. 2016-150997

(51) Int. Cl.
*G06F 3/048* (2013.01)
*G06F 3/12* (2006.01)

(52) U.S. Cl.
CPC ............ *G06F 3/1285* (2013.01); *G06F 3/048* (2013.01); *G06F 3/1271* (2013.01); *H04N 2201/0094* (2013.01)

(58) Field of Classification Search
CPC ........... H04N 1/00188; H04N 1/00233; H04N 2201/0094; H04N 2201/3222;
(Continued)

(56) References Cited

U.S. PATENT DOCUMENTS

2006/0290963 A1* 12/2006 Sakuraba .............. G06F 3/1204
358/1.13
2007/0201091 A1* 8/2007 Tanaka .................. G06F 3/1204
358/1.16

(Continued)

FOREIGN PATENT DOCUMENTS

JP       8-221227 A     8/1996
JP    2003-334999 A    11/2003
(Continued)

OTHER PUBLICATIONS

The extended European Search Report dated Jan. 2, 2018, by the European Patent Office in corresponding European Application No. 17183575.4. (7 pages).

*Primary Examiner* — Jamares Q Washington
(74) *Attorney, Agent, or Firm* — Buchanan Ingersoll & Rooney PC

(57) ABSTRACT

An image forming apparatus having a function to communicate with a terminal is provided. The image forming apparatus includes a receiver configured to receive, from the terminal, a print command to print a rasterized image having been stored; a user interface configured to receive, from a user, an execution command to print the rasterized image after the receiver receives the print command; and a printer configured to print the rasterized image after the user interface receives the execution command.

14 Claims, 15 Drawing Sheets

(58) Field of Classification Search
CPC ............ H04N 1/00177; H04N 1/00206; G06F 3/1285; G06F 3/1271
USPC ........................................ 358/1.15; 709/231
See application file for complete search history.

(56) References Cited

U.S. PATENT DOCUMENTS

| | | | |
|---|---|---|---|
| 2008/0180747 A1* | 7/2008 | Tsuzuki | H04N 1/00347 358/1.16 |
| 2009/0027722 A1* | 1/2009 | Tsujimoto | H04N 1/00222 358/1.15 |
| 2013/0286425 A1* | 10/2013 | Nakamura | G06F 3/1204 358/1.13 |
| 2016/0105582 A1* | 4/2016 | Nakajima | G06F 3/1238 358/1.15 |

FOREIGN PATENT DOCUMENTS

| | | |
|---|---|---|
| JP | 2007-241648 A | 9/2007 |
| JP | 2008-258777 A | 10/2008 |
| JP | 2009-205257 A | 9/2009 |
| JP | 2015-229251 A | 12/2015 |
| JP | 2015-229252 A | 12/2015 |

\* cited by examiner

| JOB NUMBER | TYPE | USER CODE | DATE AND TIME | EXECUTION RESULT | FILE NAME |
|---|---|---|---|---|---|
| J0001 | COPY | U001 | 2016/6/1 12:30 | NORMAL | file-J0001 ~6A |
| J0002 | PC PRINTING | U002 | 2016/6/1 12:40 | NORMAL | file-J0002 ~6A |
| J0003 | COPY | U101 | 2016/6/1 12:50 | NORMAL | file-J0003 ~6A |
| J0004 | COPY | U002 | 2016/6/1 13:00 | NORMAL | file-J0004 ~6A |
| J0005 | PC PRINTING | U006 | 2016/6/1 13:10 | NORMAL | file-J0005 ~6A |
| ... | ... | ... | ... | ... | ... |

FIG. 8

| NO. | TYPE | DOCUMENT NAME/ DESTINATION | DATE AND TIME | NUMBER OF SHEETS | EXECUTION RESULT |
|---|---|---|---|---|---|
| 0051 | COPY | aaaaa | 04:21 | 1 | FINISHED NORMALLY |
| 0050 | COPY | bbbbb | 04:20 | 1 | FINISHED NORMALLY |
| 0049 | COPY | ccccc | 04:19 | 1 | FINISHED NORMALLY |
| 0048 | COPY | ddddd | 04:18 | 1 | FINISHED NORMALLY |
| 0047 | COPY | eeeee | 04:14 | 3 | FINISHED NORMALLY |
| 0046 | COPY | fffff | 07/16 | 1 | FINISHED NORMALLY |
| 0045 | COPY | ggggg | 07/14 | 3 | FINISHED NORMALLY |

RUNNING | RECORD | COMMUNICATION LIST

JOB SELECTION: ALL

REFINE CONDITIONS
- ALL JOBS
- FINISHED JOBS
- DELETED JOBS

DETAILS

OK | CLOSE

| JOB NUMBER | USER CODE | COMMAND DATE AND TIME | FILE NAME |
|---|---|---|---|
| J0001 | U001 | 2016/6/1 13:15 | file-J0003 } 6G |
| J0002 | U002 | 2016/6/1 13:25 | file-J0002 } 6G |
| ... | ... | ... | ... |

IMAGE FORMING APPARATUS, PRINTING METHOD, AND NON-TRANSITORY RECORDING MEDIUM FOR STORING COMPUTER READABLE PROGRAM

Japanese Patent application No. 2016-150997 filed on Aug. 1, 2016, including description, claims, drawings, and abstract of the entire disclosure is incorporated herein by reference in its entirety.

BACKGROUND

1. Technological Field

The present invention relates to a technique of an image forming apparatus which prints an image in accordance with a command from a remote location.

2. Description of the Related Art

Conventional image forming apparatuses called "multifunction devices" or "Multi Function Peripherals (MFPs)" have a PC printing feature. The PC printing feature is to print an image onto paper based on data received from a terminal, such as a personal computer, connected to perform communication with the image forming apparatus. The PC printing feature is sometimes called "network printing" or "network print". The PC printing feature enables a user to use the terminal to give a print job command to the image forming apparatus from a remote location.

Such technologies for giving a print job command to an image forming apparatus from a remote location include, for example, the following technologies.

According to one of the technologies, an image forming apparatus receives a job having image data to be printed from a user PC and carries out printing. The image forming apparatus then informs the user PC of the completion of printing. The image forming apparatus gives a storage ID to the job concerning the printing to save the resultant. The user PC displays a screen to notify of the completion of printing, and a button for instructing reprinting is displayed on the screen. Pressing the button causes the user PC to give a command to reprint the job to the image forming apparatus, so that the image forming apparatus carries out the reprinting (Japanese Unexamined Patent Application Publication No. 2007-241648).

According to one of the technologies, a network printer has a file server which is configured to store, in a record queue, a predetermined amount of jobs completely delivered to a printer server. For reprinting, the record queue is used and the reprinting is carried out from a printer without resending file data completely printed from a terminal to the queue (Japanese Unexamined Patent Application Publication No. 8-221227).

According to one of the technologies, in a printer of a print control system, a print control part causes an image forming part to print a document instructed to be printed by a client terminal. A document maintenance control part stores the document in a storage part. A print history managing part manages a print history of printed documents. When a document to be reprinted is selected from the print history displayed in an operation part by a print history display control part, a reprint control part displays a print setting screen that disables the acceptance of designation of the kind of paper in the print history of the document, then accepts the input of the kind of paper corresponding to intended printing, makes print settings, reads the document from the storage part, and causes the image forming part to reprint the document based on the print settings set on the print setting screen (Japanese Unexamined Patent Application Publication No. 2009-205257).

According to one of the technologies, a recorder includes a means for connecting with an external terminal, a memory means for storing a print file received from the external terminal, a means for managing the print file stored in the memory means, and a means for recording the contents of the print file received from the external terminal on a sheet. When the print file is received from the external terminal, the file management information of that print file is acquired and stored in the means for managing the print file thus managing the print file (Japanese Unexamined Patent Application Publication No. 2003-334999).

According to one of the technologies, in normal printing, a network multifunctional device sends a print ID acquisition request to a management server and prints out a print ID acquired from the management server over print data. Further, the network multifunctional device converts the print data into the PDF format etc., and then makes the converted file and the print ID correspond to each other. The management server allocates the print ID which is uniquely identifiable on a network to the network multifunctional device in response to the print ID acquisition request, and stores the converted file transmitted from the network multifunctional device. In reprinting, a user confirms the print ID of the print data to be reprinted from an output document, and enters the print ID to the network multifunctional device. A converted file request unit acquires the converted file corresponding to the print ID entered by the user as reprint data from the management server (Japanese Unexamined Patent Application Publication No. 2008-258777).

According to one of the technologies, an image formation device includes an operation part detachable from the image formation device, and saves a job having an attribute for authentication and a job having an attribute for no authentication to a preserving means. Under this situation, when a print request for the job having an attribute for authentication is accepted, execution of the job for which authentication is made is controlled according to attaching/detaching state of the operation part (Japanese Unexamined Patent Application Publication No. 2015-229251). The image formation device is capable of carrying out security printing in which a print job having confidential attributes received from a PC is temporarily stored into a ROM instead of being printed immediately.

According to one of the technologies, an image formation device is provided with an operation part detachable from the image formation device. When it is determined that a first attribute is set to attribute information of a received job and further when it is determined that the operation part is not connected to the image formation device, an information processing device is informed of the fact that the job cannot be processed because the operation part is not connected to the image formation device. Then, according to a response received from the information processing device for the notification, the attribute of the job stored in a storing means is set to be a second attribute for authentication with the user ID, instead of the first attribute. Based on the user ID accepted, control is made to print the job in which the second attribute is set (Japanese Unexamined Patent Application Publication No. 2015-229252). The image formation device is capable of carrying out secure printing in which, for printing of a highly confidential document, printing is not executed unless a preset password is entered.

When a plurality of users give print job commands to an image forming apparatus around the same time, a printed matter of one of the users is erroneously taken away by another user in some cases.

To be specific, in one case, where a first user remotely gives a print job command to an image forming apparatus, and soon after, a second user directly operates the image forming apparatus to give a print job command, the second user mistakes a printed matter to be taken by the first user as the second user's printed matter to carry away the same.

In another case, where a first user remotely gives a print job command to an image forming apparatus while a second user directly operates the image forming apparatus to give print job commands a plurality of times, a printed matter to be taken by the first user is mixed with a second user's printed matter, and the second user takes away all the printed matters.

Each of the foregoing technologies described from Japanese Unexamined Patent Application Publication No. 2007-241648 to Japanese Unexamined Patent Application Publication No. 2008-258777 simply describes receiving a print job command or a reprint job command from a remote location and printing an image. None of the technologies can solve the foregoing problem.

The use of the security printing described in Japanese Unexamined Patent Application Publication No. 2015-229251 or the secure printing described in Japanese Unexamined Patent Application Publication No. 2015-229252 can solve the foregoing problem arising in association with the PC printing feature.

It is, however, also necessary to prevent the occurrence of a case in which a printed matter is erroneously taken away even in the case of using a feature, other than the PC printing feature, to remotely give a print job command to an image forming apparatus.

SUMMARY

The present invention has been achieved in light of such a problem, and therefore, an object of an embodiment of the present invention is to prevent, as compared with the conventional technologies, the occurrence of a case in which a printed matter is erroneously taken away in the case of using a feature other than the PC printing feature to remotely give a print job command to an image forming apparatus.

To achieve at least one of the abovementioned objects, according to an aspect of the present invention, an image forming apparatus reflecting one aspect of the present invention has a function to communicate with a terminal, and includes a receiver configured to receive, from the terminal, a print command to print a rasterized image having been stored; a user interface configured to receive, from a user, an execution command to print the rasterized image after the receiver receives the print command; and a printer configured to print the rasterized image after the user interface receives the execution command.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 5 is a diagram showing an example of a job record storage portion.

FIG. 8 is a diagram showing an example of a job record list screen.

FIG. 10 is a diagram showing an example of a pending job storage portion.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
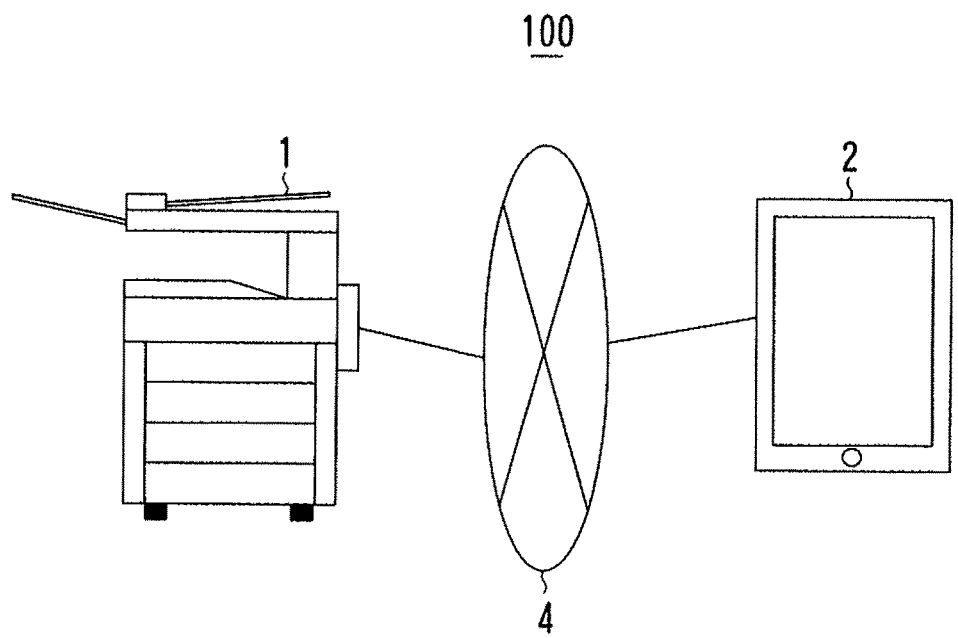
FIG. 1 is a diagram showing an example of the overall configuration of a security printing system.
Figure 2:
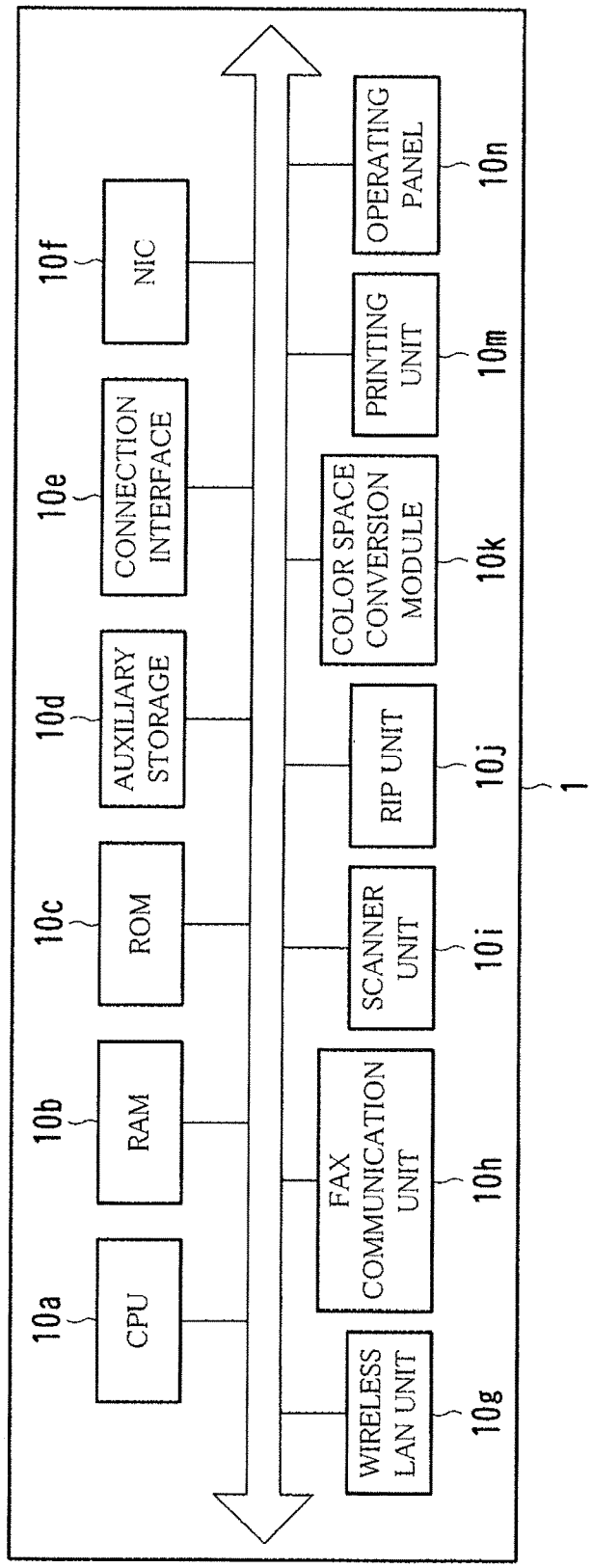
FIG. 2 is a diagram showing an example of the hardware configuration of an image forming apparatus.
Figure 3:
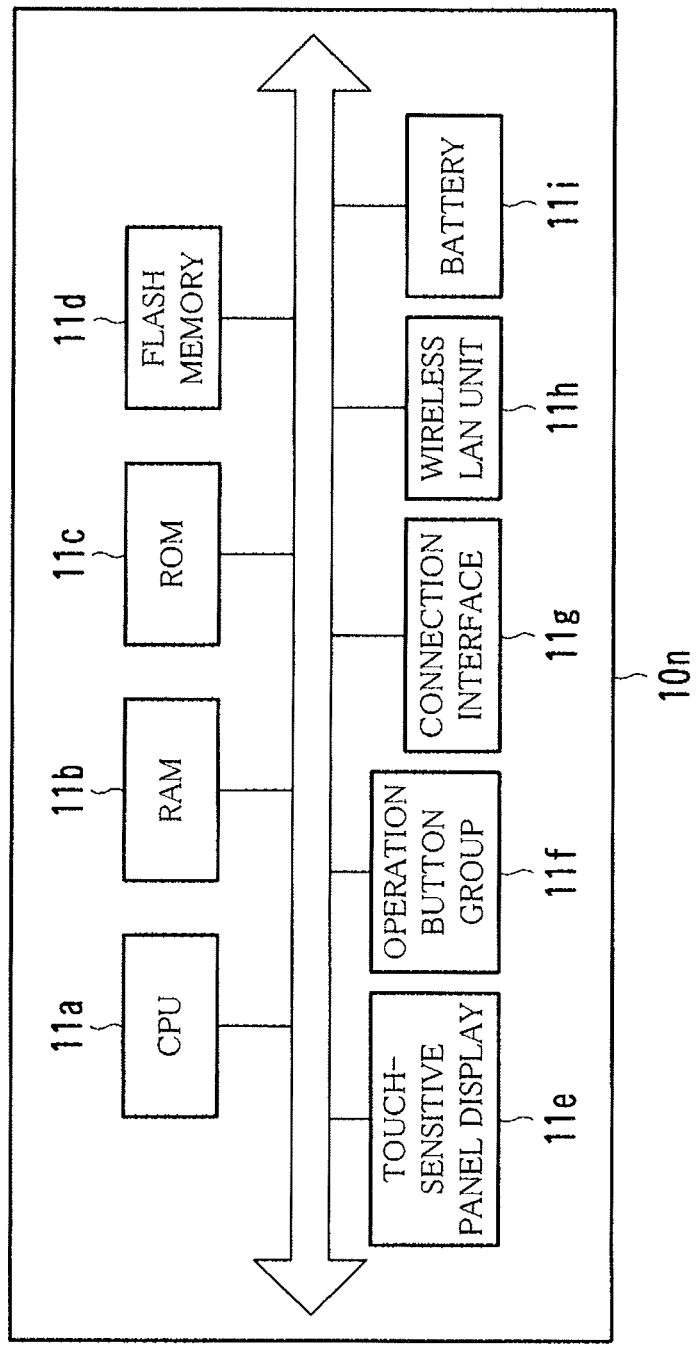
FIG. 3 is a diagram showing an example of the hardware configuration of an operating panel.

FIG. 1 is a diagram showing an example of the overall configuration of a security printing system 100. FIG. 2 is a diagram showing an example of the hardware configuration of an image forming apparatus 1. FIG. 3 is a diagram showing an example of the hardware configuration of an operating panel 10n.

As shown in FIG. 1, the security printing system 100 is configured of the image forming apparatus 1, a terminal 2, a communication line 4, and so on.

The image forming apparatus 1 and the terminal 2 are configured to perform communication with each other via the communication line 4. Examples of the communication line 4 include the Internet, a Local Area Network (LAN), a public circuit, and a dedicated line.

The image forming apparatus 1 is an apparatus into which features such as copying, PC printing, faxing, scanning, and a box feature are incorporated. The image forming apparatus 1 is generally called a "multifunction device" or a "Multi-Functional Peripheral (MFP)".

The PC printing feature is to print an image onto paper based on image data received from the terminal 2. The PC printing feature is also called a "network printing" feature or a "network print" feature in some cases.

According to the box feature, each user is given a storage area called a "box" or a "personal box". The box feature enables each user to save image data to his/her storage area and to manage the image data therein. It is also possible to provide each group with a box to be shared by members of the group. The box corresponds to a "folder" or a "directory" in a personal computer.

Referring to FIG. 2, the image forming apparatus 1 is configured of a Central Processing Unit (CPU) 10a, a Random Access Memory (RAM) 10b, a Read Only Memory (ROM) 10c, an auxiliary storage 10d, a connection interface 10e, a Network Interface Card (NIC) 10f, a wireless LAN unit 10g, a fax communication unit 10h, a scanner unit 10i, a Raster Image Processor (RIP) unit 10j, a color space conversion module 10k, a printing unit 10m, an operating panel 10n, and so on.

The connection interface 10e is connected to a connection interface 11g of the operating panel 10n. The connection interface 10e is a circuit to receive an input of a signal indicating operation on the operating panel 10n, and to output, to a touch-sensitive panel display 11e described later, data for displaying a screen for presenting messages to a user, a screen for allowing the user to enter commands or information, a screen for showing the results of processing executed by the CPU 10a, and so on. The connection interface 10e is, for example, a circuit of the standard for Universal Serial Bus (USB).

The NIC 10f performs communication with the terminal 2 and so on in accordance with a protocol such as Transmission Control Protocol/Internet Protocol (TCP/IP).

The wireless LAN unit 10g performs communication based on the standard for wireless LAN, specifically, the standard for Institute of Electrical and Electronics Engineers (IEEE) 802.11.

The fax communication unit 10h sends and receives image data with a fax terminal in accordance with a protocol such as G3.

The scanner unit 10i optically reads an image recorded on a sheet placed on a platen glass to generate Red-Green-Blue color model (RGB) image data.

The RIP unit 10j rasterizes image data in page-description language (PDL) sent from the terminal 2 to convert the resultant into Cyan Magenta Yellow Key plate color model (CMYK) print data.

The color space conversion module 10k converts the RGB image data generated by the scanner unit 10i into CMYK print data.

The printing unit 10m prints, onto paper, an image based on the CMYK print data obtained by the conversion by the RIP unit 10j, the CMYK print data obtained by the conversion by the color space conversion module 10k, and the like.

The ROM 10c or the auxiliary storage 10d stores, therein, a program for implementing the foregoing features such as the copy feature. The ROM 10c or the auxiliary storage 10d also stores a job execution program 10P (FIG. 4) therein. The job execution program 10P is described later. The programs are loaded into the RAM 10b as necessary and are executed by the CPU 10a. The auxiliary storage 10d is, for example, a hard disk drive or a Solid State Drive (SSD).

The operating panel 10n is a device to receive a print job command and other commands given by the user, to display a setting screen for the image forming apparatus 1, and so on. The operating panel 10n is formed to be detachable from the main body of the image forming apparatus 1.

Referring to FIG. 3, the operating panel 10n is configured of hardware modules such as a CPU 11a, a RAM 11b, a ROM 11c, a flash memory 11d, the touch-sensitive panel display 11e, an operation button group 11f, the connection interface 11g, a wireless LAN unit 11h, a battery 11i, and so on.

The touch-sensitive panel display 11e displays, for example, the foregoing screens. The touch-sensitive panel display 11e also sends a signal indicating a touched location to the CPU 10a or the CPU 11a.

The operation button group 11f is a so-called hardware keyboard. The operation button group 11f has numeric keys, a start key, a stop key, and function keys.

The battery 11i is a secondary battery for supplying electric power to the hardware modules of the operating panel 10n. Connecting the operating panel 10n via the connection interface 11g to the image forming apparatus 1 causes the power to be supplied to the battery 11i.

The ROM 11c or the flash memory 11d stores, therein, a program for displaying the foregoing screens and a program for receiving information entered by the user. The programs are loaded into the RAM 11b as necessary and are executed by the CPU 11a.

Referring back to FIG. 1, the terminal 2 causes the image forming apparatus 1 to execute PC printing, receives image data obtained through scanning by the image forming apparatus 1, and so on. The terminal 2 has installed therein a common web browser.

Examples of the terminal 2 include a personal computer, a smartphone, a wearable terminal, and a tablet computer. The following description takes an example in which the terminal 2 is a tablet computer.

[Control on Individual Portions and Processing Thereof Implemented by the Job Execution Program 10P]

Figure 4:
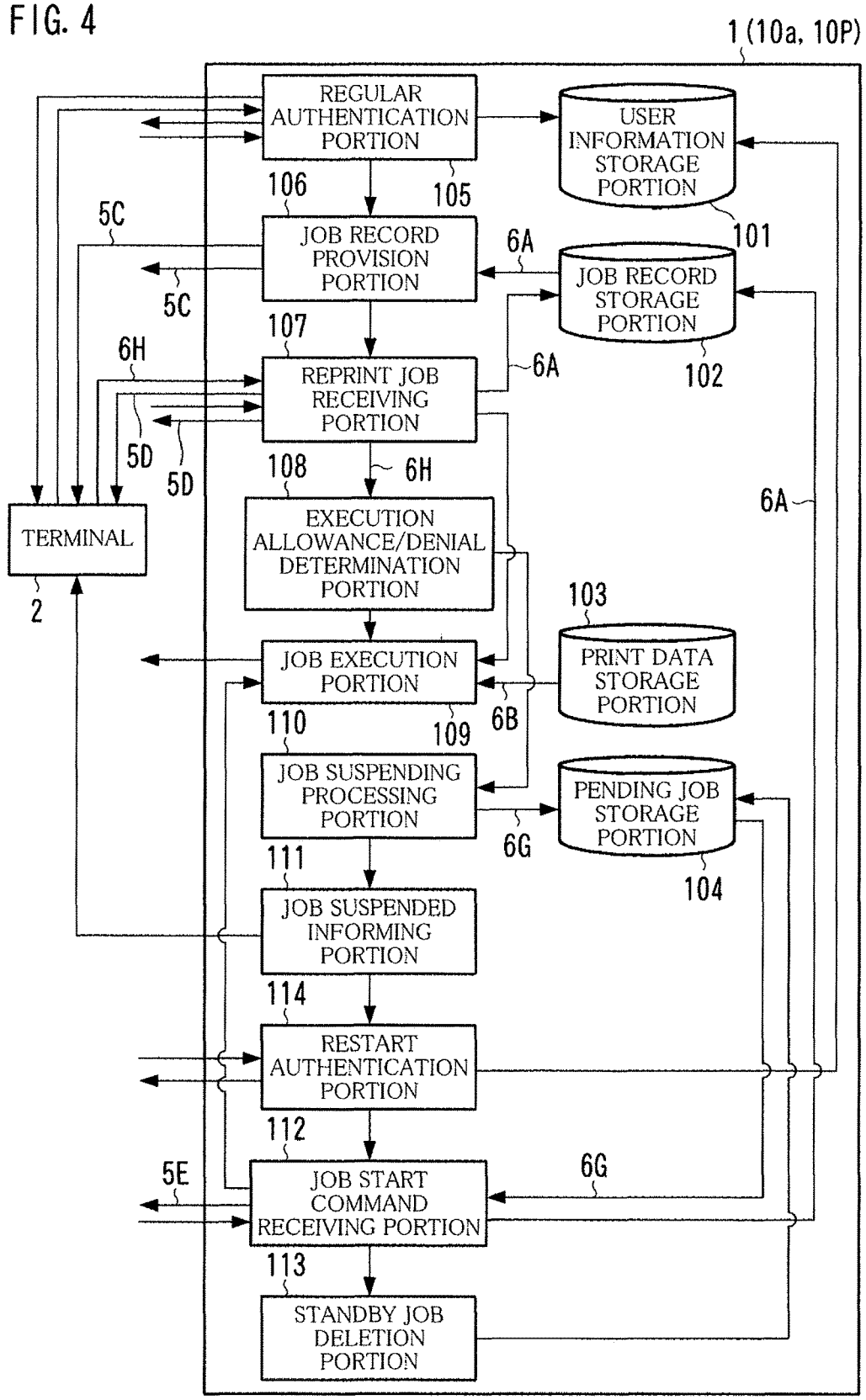
FIG. 4 is a diagram showing an example of the functional configuration of an image forming apparatus.

FIG. 4 is a diagram showing an example of the functional configuration of the image forming apparatus 1. The job execution program 10P implements, in the image forming apparatus 1, the functions of a user information storage portion 101, a job record storage portion 102, a print data storage portion 103, a pending job storage portion 104, a regular authentication portion 105, a job record provision portion 106, a reprint job receiving portion 107, an execution allowance/denial determination portion 108, a job execution portion 109, a job suspending processing portion 110, a job suspended informing portion 111, a job start command receiving portion 112, a standby job deletion portion 113, a restart authentication portion 114, and so on. The description goes on to the processing by the individual portions at the time of printing by the image forming apparatus 1. The description is provided with reference to the drawings.

[User Authentication, Login]

The user information storage portion 101 stores, in advance, user codes and passwords of the users of the image forming apparatus 1 in such a manner that the user codes and the passwords are associated with each other on a user-by-user basis.

In order to use the image forming apparatus 1, the user operates the touch-sensitive panel display 11e to make a login request to the image forming apparatus 1. Alternatively, in order to use the image forming apparatus 1, the user activates the web browser stored in the terminal 2 to access the image forming apparatus 1 to make a login request to the image forming apparatus 1.

In response to the login request from the user, the image forming apparatus 1 requests his/her user code and password from the user. The image forming apparatus 1 searches, in the user information storage portion 101, for a user code which is the same as the user code entered by the user into the touch-sensitive panel display 11e or as the user code sent from the terminal 2. The image forming apparatus 1 then checks whether or not a password corresponding to the user code found out by the search is the same as the password entered or sent. When both the passwords are the same as each other, the image forming apparatus 1 permits the user to log thereinto. The image forming apparatus 1 then displays, on the touch-sensitive panel display 11e, the fact that the user is successfully logged in or informs the terminal 2 of the fact.

[Execution of Basic Print Job and Record of the Job Execution]

Figure 6:
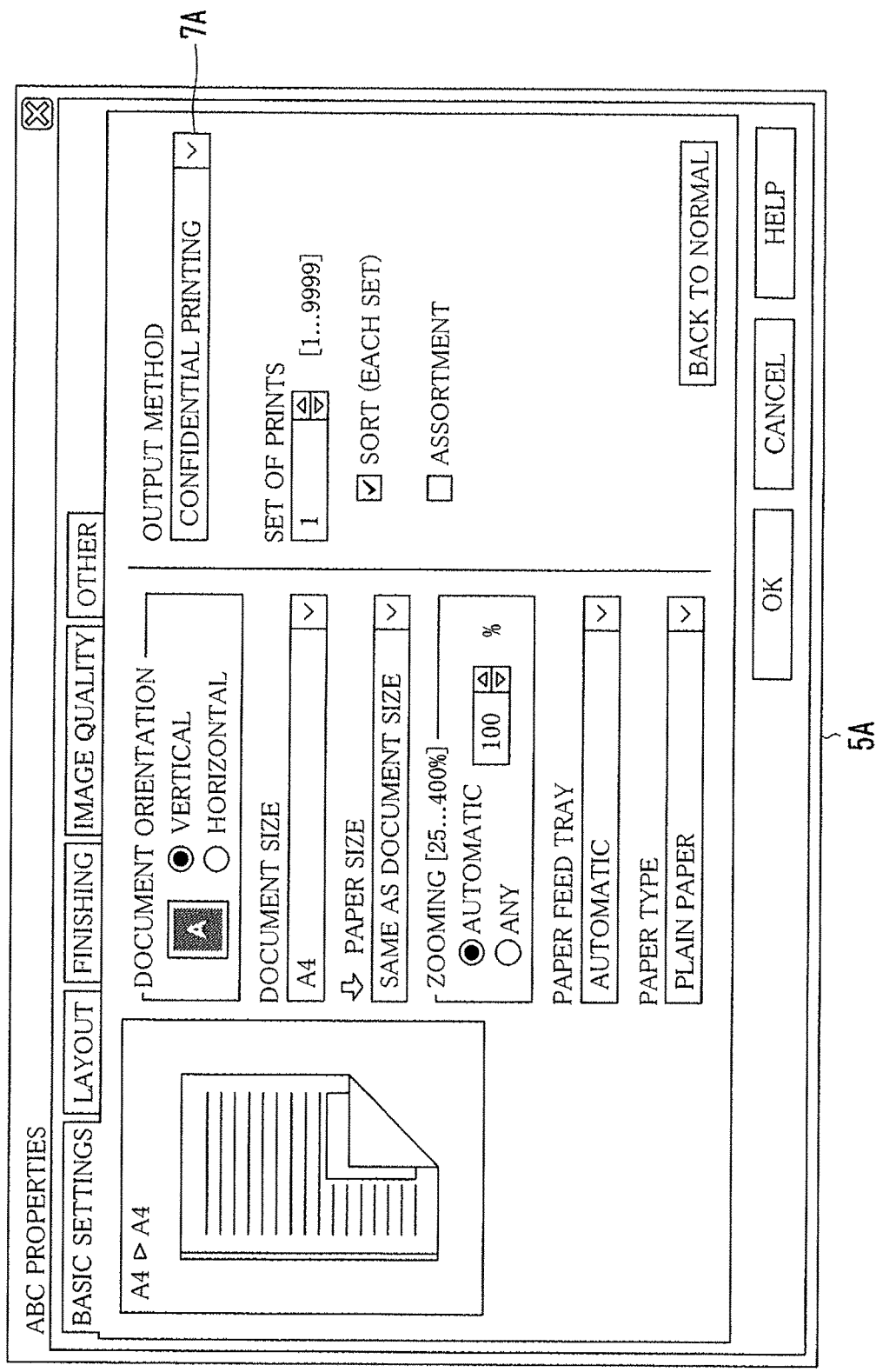
FIG. 6 is a diagram showing an example of a PC printing screen.
Figure 7:
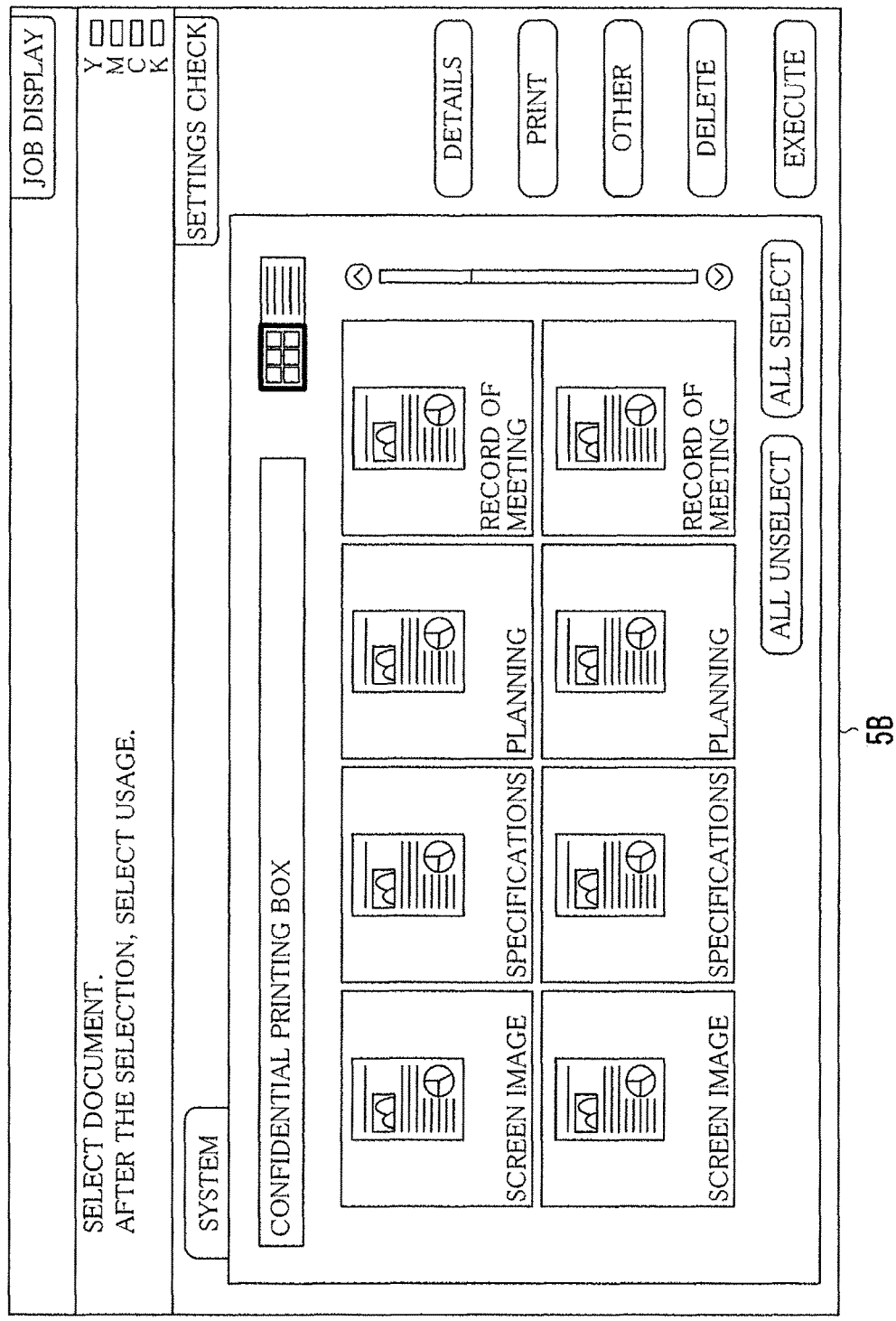
FIG. 7 is a diagram showing an example of a confidential printing selection screen.

FIG. 5 is a diagram showing an example of the job record storage portion 102. FIG. 6 is a diagram showing an example of a PC printing screen 5A. FIG. 7 is a diagram showing an example of a confidential printing selection screen 5B.

Referring to FIG. 5, the job record storage portion 102 stores, therein, job record data 6A for each of print jobs executed. The item "job number" indicates the number of a print job executed. The item "type" indicates a kind of the corresponding print job. The item "user code" indicates an ID of a user who has given a command to execute the corresponding print job. The item "date and time" indicates a date and time at which the corresponding print job has been executed. The item "execution result" indicates whether or not the corresponding print job has been executed normally. The item "file name" indicates an identifier of print data 6B used to execute the corresponding print job.

The print data storage portion 103 stores, on a file-by-file basis, the print data 6B used to execute each of the print jobs executed.

The job record data 6A and the print data 6B are stored into the job record storage portion 102 and the print data storage portion 103, respectively, in the manner discussed below. Suppose that the user has already logged in the image forming apparatus 1.

In the case of a copy job, the user places a sheet on which a document to be copied is depicted onto the scanner unit 10i to give a command to execute a print job.

In response to the command, the scanner unit 10i reads out the document on the sheet to generate RGB image data 6C. The color space conversion module 10k converts the image data 6C into CMYK image data 6D1. The printing unit 10m executes the print job based on the image data 6D1. Incidentally, in response to the command received, a job number is issued.

File conversion processing is performed on the image data 6D1, and a file name is given to the resultant. The image data 6D1 is then stored, as the print data 6B, into the print data storage portion 103.

Data indicating information on the execution of the print job, specifically, the issued job number, the type of the print job, the date and time at which the print job has been executed, the execution result, the given file name, and the user code of the user who has given the command to execute the print job, is stored into the job record storage portion 102 as the job record data 6A.

In the case of a PC printing job, the user selects, as document, data to be printed from among sets of document data 6E data which are created with an application or downloaded from a server over the Internet by the user and then are stored in the terminal 2. Then, an application corresponding to the document data 6E is used to open the document data 6E. After that, the user sets printing conditions and gives a command to conduct printing on the PC printing screen 5A shown in FIG. 6. At this time, the user may turn on an option of confidential printing in a pull-down menu 7A of the PC printing screen 5A.

The confidential printing feature is to stop the middle of the execution of a print job which is instructed from a remote location (stop after the rasterization, for example) and to restart the execution of the print job when the predetermined operation is directly performed on the image forming apparatus 1.

The terminal 2 converts the document data 6E into image data 6F in PDL supported in the image forming apparatus 1 to send the resultant to the image forming apparatus 1.

With the image forming apparatus 1, the RIP unit 10j converts the image data 6F sent from the terminal 2 into CMYK image data 6D2. In addition, in response to a command to execute the print job received, a job number is issued.

When the confidential printing feature is turned off, the printing unit 10m executes the print job based on the image data 6D2.

File conversion processing is performed on the image data 6D2, and a file name is given to the resultant. The image data 6D2 is then stored, as the print data 6B, into the print data storage portion 103.

As with the case of the copy job, data indicating information on the execution of the print job is stored, as the job record data 6A, into the job record storage portion 102.

When the confidential printing feature is turned on, the printing unit 10m does not conduct printing immediately. The printing unit 10m restarts a print job of which the execution is temporarily stopped when the user operates the touch-sensitive panel display 11e to directly log into the image forming apparatus 1 and then performs predetermined operation on the confidential printing selection screen 5B of FIG. 7, namely, when the user selects a print job to be restarted from among the print jobs temporarily stopped and then touches an execute button. Incidentally, the confidential printing selection screen 5B has a button for a print job on the job record data 6A indicated in the user code of the user who has logged into the image forming apparatus 1.

As with the case where the confidential printing feature is turned off, the file conversion processing is performed on the image data 6D2 and a file name is given to the resultant, and then the resultant is stored as the print data 6B into the print data storage portion 103. Data indicating information on the execution of the print job is stored, as the job record data 6A, into the job record storage portion 102.

[Execution of Reprint Job and Deletion Thereof]

Figure 9:
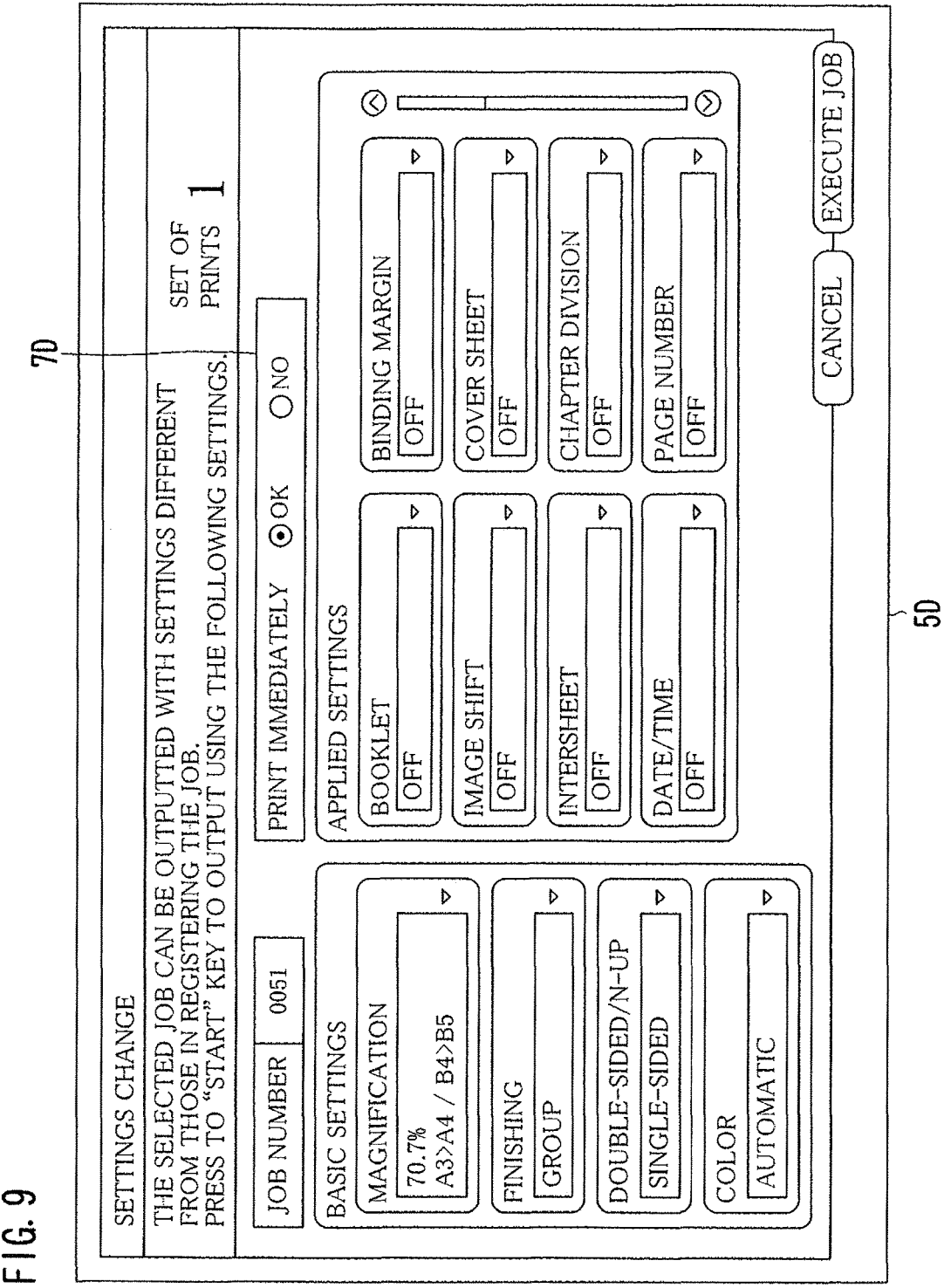
FIG. 9 is a diagram showing an example of a condition change screen.
Figure 11:
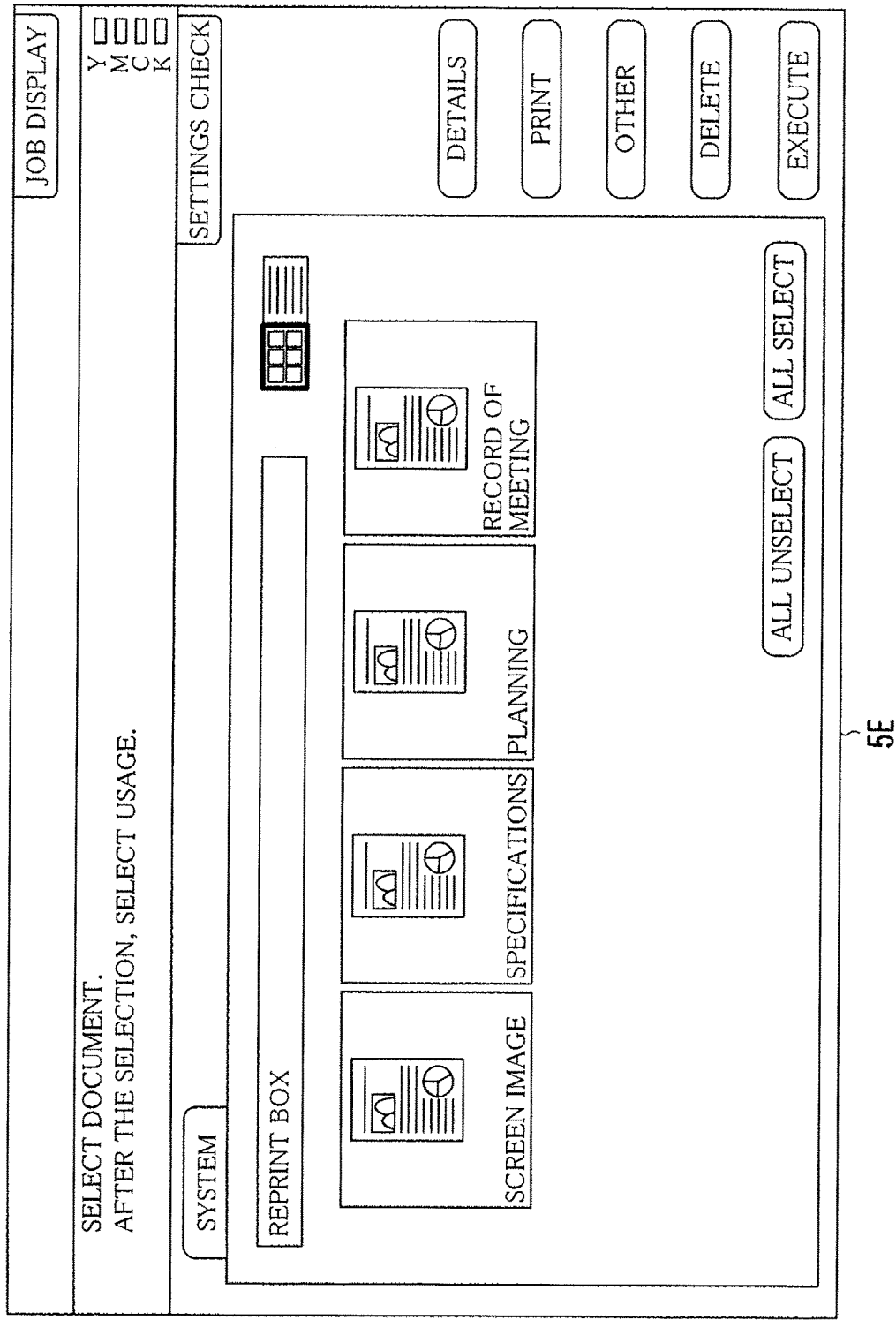
FIG. 11 is a diagram showing an example of a pending job list screen.

FIG. 8 is a diagram showing an example of a job record list screen 5C. FIG. 9 is a diagram showing an example of a condition change screen 5D. FIG. 10 is a diagram showing an example of the pending job storage portion 104. FIG. 11 is a diagram showing an example of a pending job list screen 5E.

In order to give a command to execute a reprint job, the user operates the touch-sensitive panel display 11e to make a login request to the image forming apparatus 1. Alternatively, the user operates the terminal 2 to access the image forming apparatus 1 and then makes a login request to the image forming apparatus 1.

The reprint job is a print job to print an image based on the print data 6B corresponding to a file name indicated in the job record data 6A stored in the job record storage portion 102.

The regular authentication portion 105 requests a user code and a password from the user as with the foregoing user authentication and login processing. The regular authentication portion 105 searches, in the user information storage portion 101, for a user code which is the same as the user code entered or sent by the user. The regular authentication portion 105 then checks whether or not a password corresponding to the user code found out by the search is the same as the password entered or sent. When both the passwords are the same as each other, the regular authentication portion 105 permits the user to log into the image forming apparatus 1. The regular authentication portion 105 then displays, on the touch-sensitive panel display 11e, the fact that the user is successfully logged in or informs the terminal 2 of the fact.

The user operates the touch-sensitive panel display 11e to make a request to display a list of print jobs executed in the past. Alternatively, the user operates the terminal 2 to make a request to display a list of print jobs executed in the past.

The job record provision portion 106 displays the job record list screen 5C showing the list of print jobs executed in the past on the touch-sensitive panel display 11e as shown in FIG. 8. Alternatively, the job record provision portion 106 sends data on the job record list screen 5C to the terminal 2. As with the case of the confidential printing feature, the job record list screen 5C has a button for a print job on the job record data 6A indicated in the user code of the user who has logged into the image forming apparatus 1.

The job record list screen 5C is displayed on the touch-sensitive panel display 11e. Alternatively, the terminal 2 receives the data on the job record list screen 5C to display the job record list screen 5C. The image forming apparatus 1 receives a choice of a reprint job from the user through the touch-sensitive panel display 11e. Alternatively, the terminal 2 sends data indicating the reprint job selected by the user to the image forming apparatus 1.

The reprint job receiving portion 107 issues a job number when the choice of the reprint job is received through the touch-sensitive panel display 11e, or, when the data indicating the selected reprint job is sent from the terminal 2. The reprint job receiving portion 107 also identifies job record data 6A corresponding to the reprint job.

Subsequently, the reprint job receiving portion 107 displays the condition change screen 5D on the touch-sensitive panel display 11e as shown in FIG. 9. The condition change screen 5D is to change conditions applied to the print job executed in the past to conditions to be applied to the reprint job to be executed this time. Alternatively, the reprint job receiving portion 107 sends data on the condition change screen 5D to the terminal 2. The condition change screen 5D displayed in the terminal 2 has an input field 7D into which information as to whether or not to immediately execute the reprint job is entered.

The data as to whether or not to immediately execute the reprint job is hereinafter referred to as "immediate print data 6H". It is assumed that the user operates the terminal 2 to select a reprint job.

The terminal 2 receives the data on the condition change screen 5D to display the condition change screen 5D. The terminal 2 then sends, to the image forming apparatus 1, conditions changed by the user, the immediate print data 6H, and a command to execute the reprint job.

The execution allowance/denial determination portion 108 determines whether or not to immediately execute the reprint job with reference to the immediate print data 6H received.

If the immediate print data 6H indicates that the reprint job is to be executed immediately, then the job execution portion 109 controls the printing unit 10m to print an image shown in the print data 6B corresponding to the file name of the job record data 6A identified as described above in accordance with the conditions.

The reprint job receiving portion 107 stores, as the job record data 6A, data indicating information on the execution of the reprint job into the job record storage portion 102. The data indicating information on the execution of the reprint job is, for example, the job number issued, the type of the print job, the date and time at which the reprint job has been executed, the execution result of the reprint job, the file name of the print data 6B on the printed image, and the user code of the user who has given a command to execute the reprint job.

When the user operates the touch-sensitive panel display 11e to give a command to execute the reprint job, the processing similar to that in the case of immediate execution of the reprint job is performed without the determination by the execution allowance/denial determination portion 108.

If the immediate print data 6H indicates that the reprint job is not executed immediately, then the job suspending processing portion 110 stores, as pending job data 6G, data indicating information on the reprint job into the pending job storage portion 104. The data indicating information on the reprint job is, for example, the job number issued, the date and time at which the command has been given, the file name, and the user code of the user who has given the command to execute the reprint job. Hereinafter, the reprint job that is not executed immediately is referred to as a "pending job".

Referring to FIG. 10, the pending job storage portion 104 stores, therein, pending job data 6G for each of pending jobs. The item "job number" indicates the issued number of a pending job. The item "user code" indicates an ID of a user who has given a command to execute the corresponding pending job. The item "command date and time" indicates a date and time at which the command to execute the corresponding pending job has been given. The item "file name" indicates an identifier of the print data 6B corresponding to the file name indicated in the job record data 6A identified as discussed above.

When the pending job data 6G is stored into the pending job storage portion 104, the job suspended informing portion 111 informs the terminal 2 of a job suspended message. The job suspended message indicates that a reprint job corresponding to the pending job data 6G is suspended and that a direct login to the image forming apparatus 1 is required to restart the reprint job. Examples of the method for informing include a method of referring to the user information storage portion 101 to send a notice mail to a mail address of the terminal 2 from which the command to execute the reprint job has been given.

The terminal 2 receives the job suspended message to display the same. The user checks the job suspended message to go to the installation location of the image forming apparatus 1. The user operates the touch-sensitive panel display 11e to make a login request to the image forming apparatus 1.

The restart authentication portion 114 performs processing for user authentication and login as with the foregoing processing for user authentication and login.

The job start command receiving portion 112 displays, based on the pending job data 6G of the pending job storage portion 104, the pending job list screen 5E showing a list of pending jobs as shown in FIG. 11 on the touch-sensitive panel display 11e. The job start command receiving portion 112 then receives a choice of a pending job to be restarted and a command to execute the pending job from the user. Incidentally, the pending job list screen 5E has a button for a pending job indicated in the pending job data 6G corresponding to the user code of the user who has logged into the image forming apparatus 1.

The pending job list screen 5E is displayed on the touch-sensitive panel display 11e. The image forming apparatus 1 receives the choice of the pending job and the command to execute the pending job from the user through the touch-sensitive panel display 11e.

The job execution portion 109 controls the printing unit 10m to print an image shown in the print data 6B corresponding to the file name contained in the pending job data 6G on the pending job chosen by the user in accordance with the conditions.

The job start command receiving portion 112 stores, as the job record data 6A, data indicating information on the execution of the pending job into the job record storage portion 102. The data indicating information on the execution of the pending job is, for example, the job number issued, the type of the print job, the date and time at which the pending job has been executed, the execution result of the pending job, the file name of the print data 6B on the printed image, and the user code of the user who has given a command to execute the pending job.

The standby job deletion portion 113 deletes, from the pending job storage portion 104, the pending job data 6G on the pending job which has been executed. The standby job deletion portion 113 refers to the pending job storage portion 104 at predetermined time intervals (every one minute, for example) and identifies pending job data 6G which still remains in the pending job storage portion 104 even after the conclusion of a predetermined elapsed time (30 minutes, for example) from the "command date and time" to delete the pending job data 6G identified.

[Entire Processing Flow]

Figure 12:
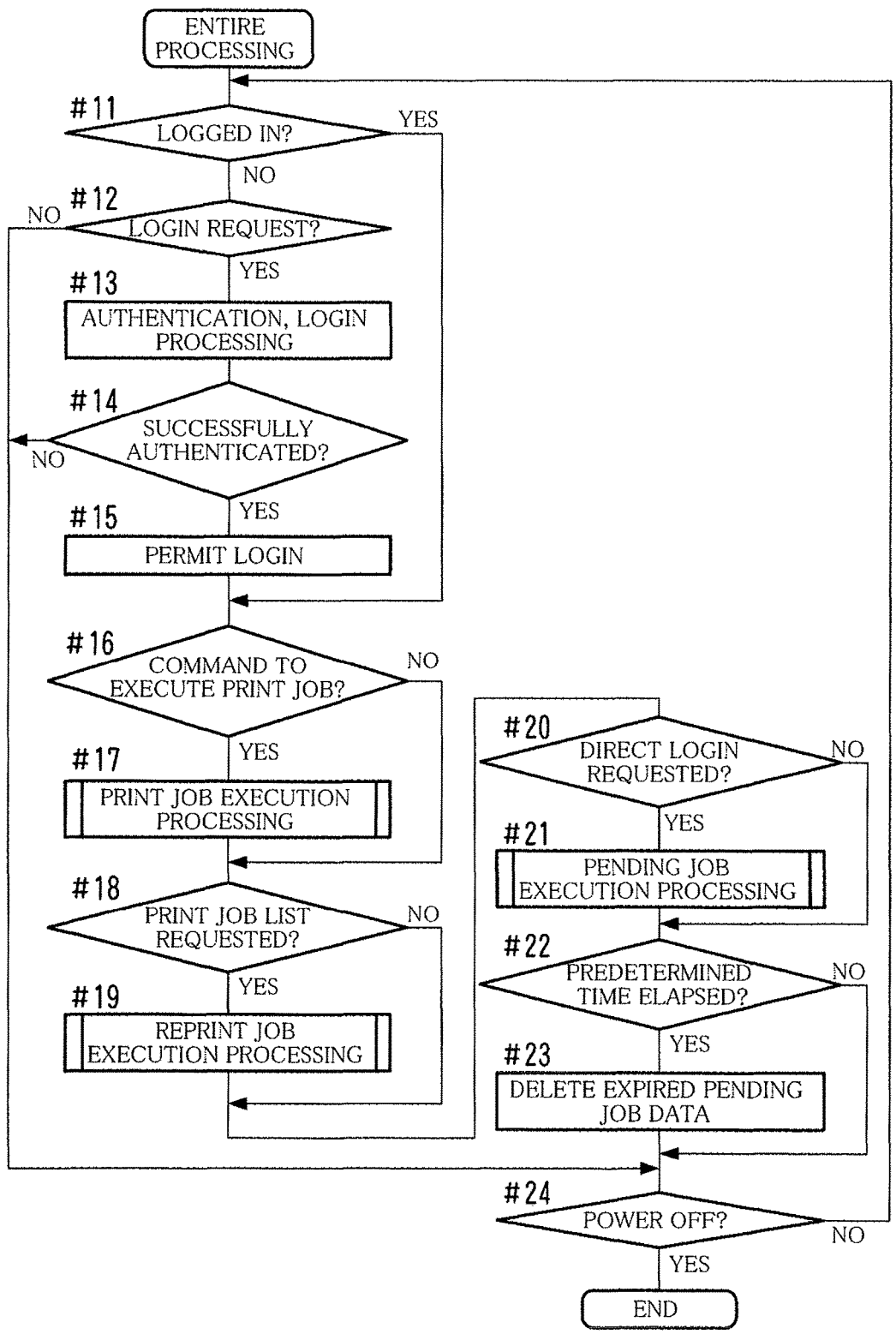
FIG. 12 is a flowchart depicting an example of the flow of the entire processing.
Figure 13:
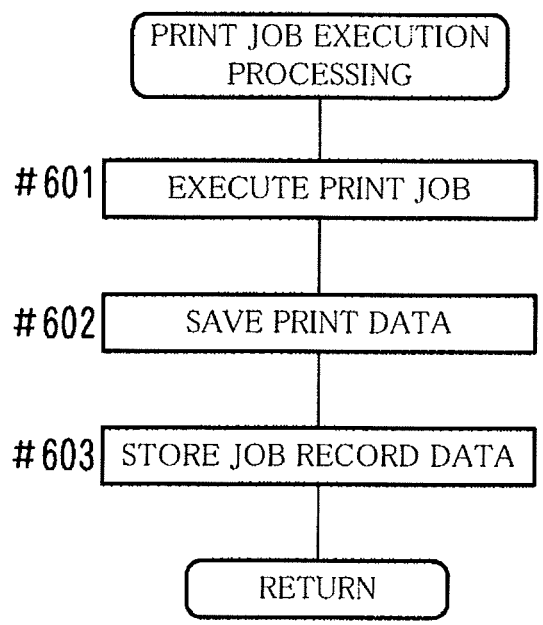
FIG. 13 is a flowchart depicting an example of the flow of print job execution processing.
Figure 14:
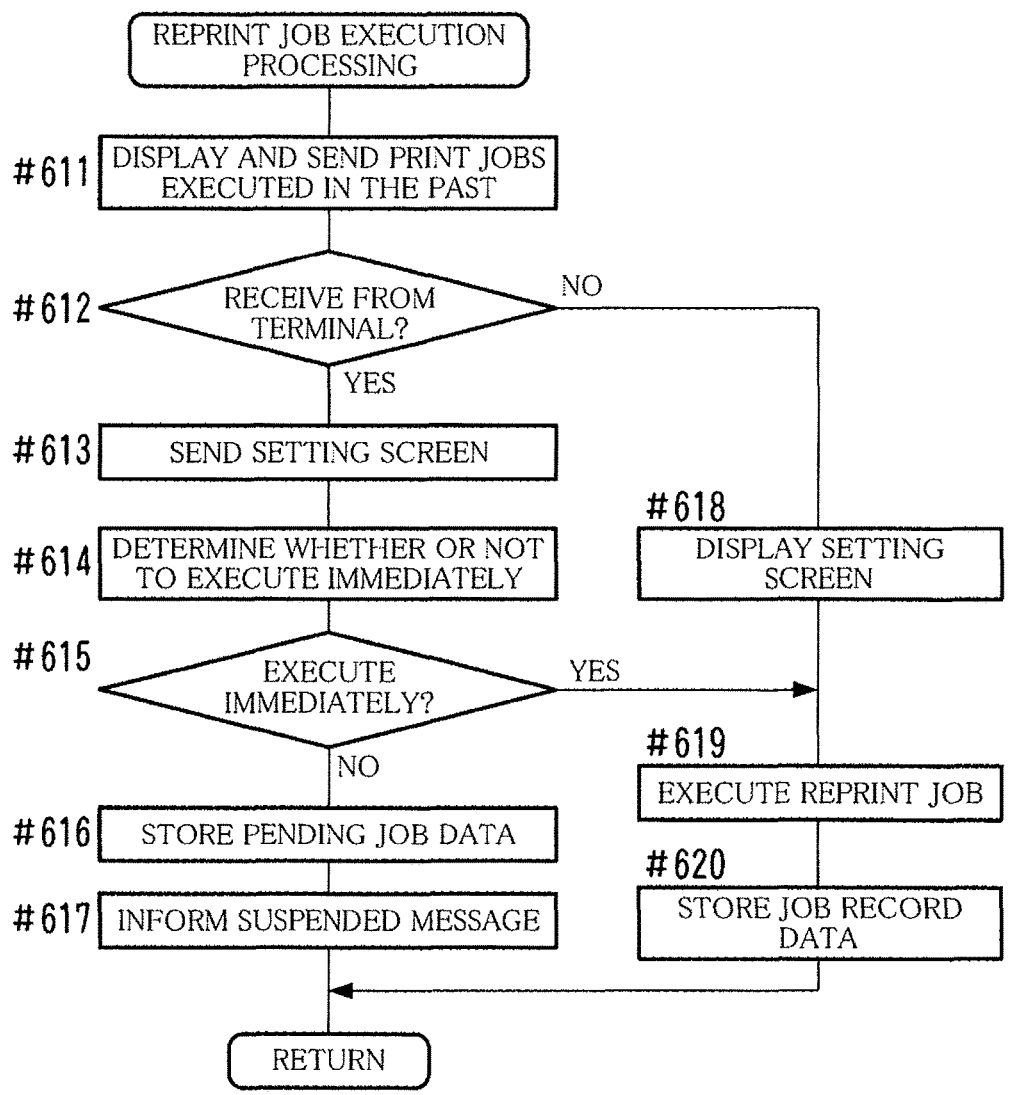
FIG. 14 is a flowchart depicting an example of the flow of reprint job execution processing.
Figure 15:
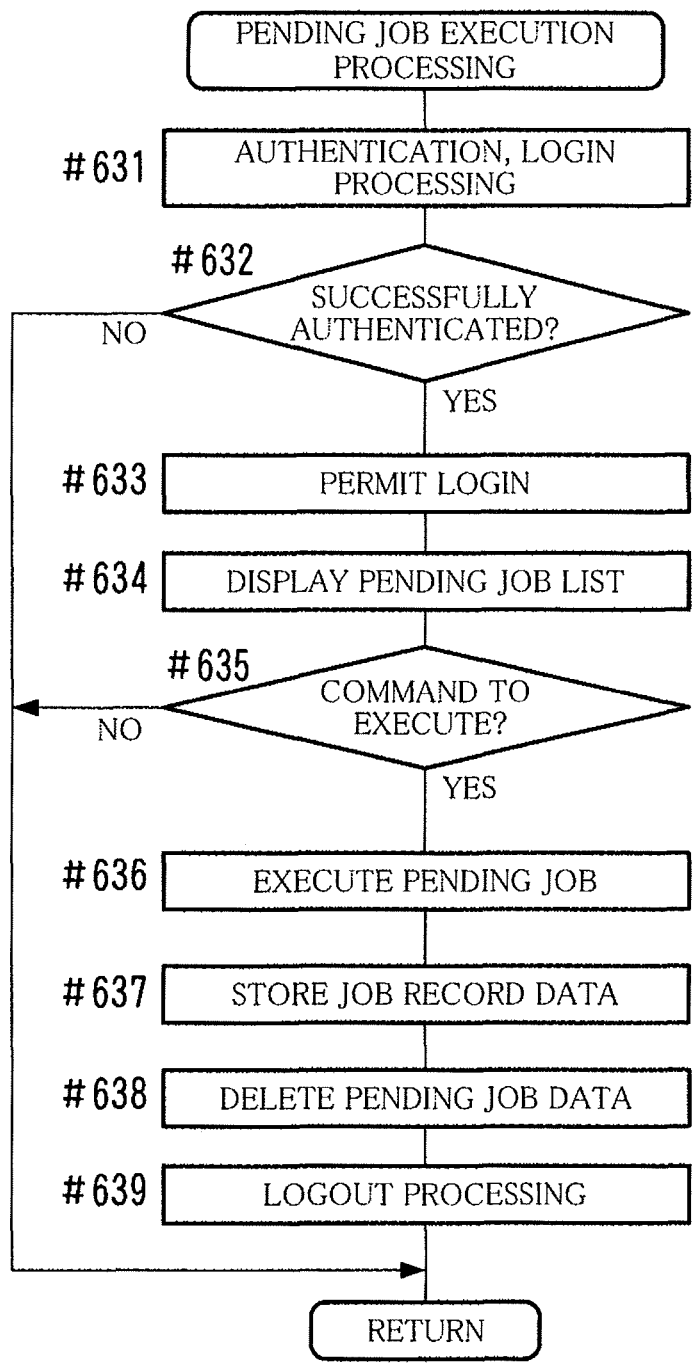
FIG. 15 is a flowchart depicting an example of the flow of pending job execution processing.

FIG. 12 is a flowchart depicting an example of the flow of the entire processing. FIG. 13 is a flowchart depicting an example of the flow of print job execution processing. FIG. 14 is a flowchart depicting an example of the flow of reprint job execution processing. FIG. 15 is a flowchart depicting an example of the flow of pending job execution processing.

The description goes on to the flow of processing by the image forming apparatus 1 having the configuration as discussed above. The description is provided with reference to the drawings. The image forming apparatus 1 executes processing based on the job execution program 10P in the steps as depicted in FIG. 12.

The user operates the touch-sensitive panel display 11e or the terminal 2 to make a login request to the image forming apparatus 1 (NO in Step #11 and YES in Step #12 of FIG. 12). In response to the request, the image forming apparatus 1 performs processing for user authentication and login by using the information entered or sent by the user and the information stored in the user information storage portion 101 (Step #13). If the user is successfully authenticated (YES in Step #14), then the image forming apparatus 1 permits the user to log thereinto (Step #15). When the user already logs in the image forming apparatus 1, the processing from Steps #12-#15 is omitted (YES in Step #11).

The user operates the touch-sensitive panel display 11e or the terminal 2 to give a command to execute a print job (YES in Step #16). In response to the command, the print job execution processing is performed in the following manner (Step #17).

The image forming apparatus 1 executes the print job in accordance with the command to execute the print job sent from the terminal 2 (Step #601 of FIG. 13). At this time, the print data 6B is generated. The image forming apparatus 1 saves both the print data 6B and the job record data 6A (Steps #602 and #603).

Referring back to FIG. 12, the user operates the touch-sensitive panel display 11e or the terminal 2 to request for display of a list of print jobs executed in the past (YES in Step #18 of FIG. 12). In response to the request, the reprint job execution processing is performed in the following manner (Step #19).

The image forming apparatus 1 displays the job record list screen 5C on the touch-sensitive panel display 11e or sends the same to the terminal 2 (Step #611 of FIG. 14). The terminal 2 displays the job record list screen 5C to send a reprint job selected by the user.

When receiving the reprint job selected from the terminal 2 (YES in Step #612), the image forming apparatus 1 sends the condition change screen 5D to the terminal 2 (Step #613). The terminal 2 displays the condition change screen 5D to send the conditions changed, the immediate print data 6H, and a command to execute the reprint job.

The image forming apparatus 1 checks the details of the immediate print data 6H (Step #614). If the immediate print data 6H indicates that the reprint job is not executed immediately (NO in Step #615), then the image forming apparatus 1 stores the pending job data 6G (Step #616) and informs the terminal 2 of a job suspended message (Step #617).

When receiving an entry of a selected reprint job from the touch-sensitive panel display 11e (NO in Step #612), the image forming apparatus 1 displays the condition change screen 5D on the touch-sensitive panel display 11e (Step #618). The image forming apparatus 1 executes the reprint job in accordance with the changed conditions entered by the user (Step #619), and stores information on the execution of the reprint job as the job record data 6A (Step #620). In short, the image forming apparatus 1 immediately executes the reprint job without putting the reprint job on hold. When the immediate print data 6H indicates that the reprint job is to be executed immediately (YES in Step #615), the processing of Steps #619 and #620 is performed.

Referring back to FIG. 12, when the user operates the touch-sensitive panel display 11e to request for a direct login (Yes in Step #20 of FIG. 12), the pending job execution processing is performed in the following manner (Step #21).

The image forming apparatus 1 uses the information entered by the user and the information stored in the user information storage portion 101 to perform processing for user authentication and login (Step #631 of FIG. 15). If the user is successfully authenticated (YES in Step #632), then the image forming apparatus 1 permits him/her to log thereinto (Step #633) and displays a list of the pending jobs (Step #634).

The image forming apparatus 1 receives, from the user, a choice of a pending job to be restarted and a command to execute the pending job (YES in Step #635). The image forming apparatus 1 executes the pending job (Step #636) to store, as the job record data 6A, information on the execution of the pending job (Step #637). The image forming apparatus 1 also deletes the pending job data 6G on the pending job (Step #638). The image forming apparatus 1 then automatically forces the user corresponding to the user code indicated in the pending job data 6G on the pending job to log out therefrom (Step #639).

Referring back to FIG. 12, at predetermined time intervals (YES in Step #22 of FIG. 12), the image forming apparatus 1 finds out pending job data 6G which has not yet been executed even after the predetermined lapse of time, and deletes the pending job data 6G found (Step #23). When a user corresponding to a user code indicated in the pending job data 6G thus deleted currently logs in the image forming apparatus 1, the image forming apparatus 1 automatically forces the user to log out therefrom. The foregoing processing continues before the image forming apparatus 1 is turned off (NO in Step #24).

In the foregoing embodiments, when a print job command is given to the image forming apparatus 1 from a remote location by using a feature other than the PC printing feature, in other words, when a command to execute a print job of printing a printed matter which has been subjected to rasterization in the image forming apparatus 1 is given from a remote location, a case is reduced in which the printed matter is erroneously taken away, as compared to conventional cases.

The foregoing embodiments may be modified as follows. The user removes the operating panel 10n from the image forming apparatus 1 to give a command to execute a reprint job from the operating panel 10n to the image forming apparatus 1.

To be specific, the user removes the operating panel 10n from the image forming apparatus 1. This makes it impossible for the image forming apparatus 1 to supply power to the battery 11i. The image forming apparatus 1 therefore recognizes that the operating panel 10n has been removed therefrom.

Before or after the removal of the operating panel 10n, the user operates the touch-sensitive panel display 11e to make a direct login request to the image forming apparatus 1. In response to the request, the regular authentication portion 105 performs processing for user login and for user authentication.

The user directly logs into the image forming apparatus 1. The user operates the touch-sensitive panel display 11e of the operating panel 10n to request for display of a list of print jobs executed in the past.

The job record provision portion 106 sends data on the job record list screen 5C to the operating panel 10n. The operating panel 10n receives the data on the job record list screen 5C to display the job record list screen 5C on the touch-sensitive panel display 11e. The operating panel 10n then transmits data indicating the reprint job chosen by the user to the image forming apparatus 1.

In response to the transmission of the data indicating the chosen reprint job, the reprint job receiving portion 107 issues a job number and identifies job record data 6A corresponding to the reprint job. The reprint job receiving portion 107 then sends data on the condition change screen 5D having the input field 7D to the operating panel 10n. The operating panel 10n receives the data on the condition change screen 5D to display the condition change screen 5D on the touch-sensitive panel display 11e. The operating panel 10n then sends conditions changed by the user, the immediate print data 6H, and a command to execute the reprint job to the image forming apparatus 1.

When the execution allowance/denial determination portion 108 determines that the immediate print data 6H indicates that the reprint job is to be executed immediately, the job execution portion 109 controls the printing unit 10m to print an image shown in the print data 6B corresponding to the file name of the job record data 6A identified as described earlier in accordance with the conditions.

The reprint job receiving portion 107 stores, as the job record data 6A, information on the execution of the reprint job into the job record storage portion 102.

When the execution allowance/denial determination portion 108 determines that the immediate print data 6H indicates that the reprint job is not executed immediately, the job suspending processing portion 110 stores, as the pending job data 6G, information on the reprint job into the pending job storage portion 104.

In response to the pending job data 6G stored into the pending job storage portion 104, the job suspended informing portion 111 informs the operating panel 10n of the job suspended message. The operating panel 10n receives the job suspended message to display the same on the touch-sensitive panel display 11e. The job suspended message indicates that the reprint job is suspended and that the operating panel 10n should be connected to the image forming apparatus 1.

The user checks the job suspended message displayed to go to the installation location of the image forming apparatus 1. The user then attaches the operating panel 10n to the image forming apparatus 1. This enables the image forming apparatus 1 to supply power to the battery 11i. The image forming apparatus 1 then recognizes that the operating panel 10n has been attached thereto.

The job start command receiving portion 112 receives, from the user, a choice of a pending job to be restarted and a command to execute the pending job. The job execution portion 109 follows the command to control the printing unit 10m. The standby job deletion portion 113 deletes pending job data 6G on the pending job thus executed. The job start command receiving portion 112 stores, as the job record data 6A, information on the pending job thus executed.

In order to implement the foregoing processing, the processing is performed or omitted as depicted in the flowcharts of FIGS. 12, 14, and 15.

The image forming apparatus 1 displays the job record list screen 5C on the touch-sensitive panel display 11e (Step #611 of FIG. 14), and then checks whether or not the operating panel 10n is removed therefrom. If determining that the operating panel 10n is removed, then the image forming apparatus 1 sends the condition change screen 5D having the input field 7D to the operating panel 10n (Step #613). Otherwise, the image forming apparatus 1 determines whether or not the reprint job has been received from the terminal 2 (Step #612).

After performing the reprint job execution processing (Step #19 of FIG. 12), the image forming apparatus 1 checks whether or not the operating panel 10n is attached thereto. If determining that the operating panel 10n is attached, then the image forming apparatus 1 displays a list of the pending jobs (Step #634 of FIG. 15). Otherwise, the image forming apparatus 1 checks whether or not the predetermined time is reached (Step #22 of FIG. 12). Since the user has directly logged in the image forming apparatus 1, the authentication processing and the login processing to execute the pending job (Step #20 of FIG. 20, and Steps #631 through #633 of FIG. 15) are omitted.

In the foregoing embodiments, when the execution allowance/denial determination portion 108 determines that the immediate print data 6H indicates that a reprint job is to be executed immediately, the reprint job is executed without being suspended. However, the following configuration is also possible: If the user uses the touch-sensitive panel display 11e to directly log into the image forming apparatus 1 before giving a command to execute a reprint job, the reprint job may be executed without the determination by the execution allowance/denial determination portion 108. This configuration improves the operational efficiency for the case where a person who waits in front of the image forming apparatus 1 to take a printed matter on behalf of the user. Another configuration is also possible in which, if the user logs into the image forming apparatus 1 before the lapse of a predetermined time (10 minutes, for example) since a command to execute a reprint job was given, the reprint job is executed without the determination by the execution allowance/denial determination portion 108.

In the foregoing embodiments, execution of a reprint job is suspended. Stated differently, a print job for the print data 6B printed in the past by the image forming apparatus 1 is suspended. Instead of this, however, even if a print job is not a reprint job, execution of the print job may be suspended as long as the print job is to print the print data 6B stored in the print data storage portion 103, in other words, as long as the print job is to print the print data 6B which has been rasterized.

In the foregoing embodiments, the terminal 2 operates the image forming apparatus 1 via the web browser. Instead of this, the user may log into a computer from a remote location to directly operate the computer. In short, remote login may be performed for the operation.

It is to be understood that the configurations of the security printing system 100, the image forming apparatus 1, and the terminal 2, the constituent elements thereof, the content of the processing, the order of the processing, the structure of the data, and the like may be appropriately modified without departing from the spirit of the present invention.

Although embodiments of the present invention have been described and illustrated in detail, it is clearly understood that the same is by way of illustration and example only and not limitation, the scope of the present invention should be interpreted by terms of the appended claims.

What is claimed is:

1. An image forming apparatus having a function to communicate with a terminal, the apparatus comprising:
    a receiver configured to receive, from the terminal, a print command to print a rasterized image having been stored in the image forming apparatus;
    an operating panel configured to receive, from a user, an execution command to print the rasterized image after the receiver receives the print command;
    a printer configured to print the rasterized image after the operating panel receives the execution command; and
    a transmitter, wherein
    the transmitter sends a previous command to print an image to the terminal, the previous command being previously received in the image forming apparatus,
    the receiver receives, as the print command, the previous command selected by the user, and
    the printer prints, as the rasterized image, a rasterized image which is printed in accordance with the previous command selected by the user.

2. The image forming apparatus according to claim 1, comprising a storage configured to store an image, wherein the rasterized image is stored in the storage.

3. The image forming apparatus according to claim 1, comprising a transmitter configured to inform, when the receiver receives the print command from the terminal, the terminal of a suspended message indicating that execution of printing the rasterized image is suspended.

4. The image forming apparatus according to claim 3, wherein
    the receiver is configured to receive, together with the print command, an immediate execution command to conduct printing immediately,
    when the receiver receives the immediate execution command, the transmitter does not inform the terminal of the suspended message, and
    when the receiver receives the immediate execution command, the printer prints the rasterized image even if the user interface has not yet received the execution command.

5. The image forming apparatus according to claim 3, comprising a hardware processor configured to perform, before the receiver receives the print command, authentication on the user who attempts to log into the image forming apparatus, wherein
    when the hardware processor performs the authentication successfully, the transmitter does not inform the terminal of the suspended message, and
    when the hardware processor performs the authentication successfully, the printer prints the rasterized image even if the user interface has not yet received the execution command.

6. The image forming apparatus according to claim 1, wherein the hardware processor cancels the print command when the print command has not yet been executed after a predetermined amount of time has elapsed since the receiver received the print command.

7. A printing method used in an image forming apparatus having a function to communicate with a terminal, the method comprising:
    receiving processing, in the image forming apparatus, of receiving, from the terminal, a print command to print a rasterized image having been stored in the image forming apparatus;
    execution receiving processing, in the image forming apparatus, of receiving, from a user, an execution command to print the rasterized image after the print command is received in the receiving processing; and
    print processing, in the image forming apparatus, of printing the rasterized image after the execution command is received in the execution receiving processing, wherein
    the computer causes the image forming apparatus to perform transmission processing of sending a previous command to print an image to the terminal, the previous command being previously received in the image forming apparatus,
    the receiving processing is to receive, as the print command, the previous command selected by the user, and
    the print processing is to print, as the rasterized image, a rasterized image which is printed in accordance with the previous command selected by the user.

8. A non-transitory recording medium for storing a computer readable program used in a computer, the computer causing the image forming apparatus to perform the printing method according to claim 7.

9. The non-transitory recording medium according to claim 8, wherein
    the image forming apparatus includes a storage configured to store an image therein, and
    the rasterized image is stored in the storage.

10. The non-transitory recording medium according to claim 8, wherein, when the print command is received from the terminal in the receiving processing, the computer causes the image forming apparatus to perform informing processing of informing the terminal of a suspended message indicating that execution of printing the rasterized image is suspended.

11. The non-transitory recording medium according to claim 10, wherein
    when, in the receiving processing, an immediate execution command to conduct printing immediately is received together with the print command, the computer does not cause the image forming apparatus to perform the informing processing, and
    when, in the receiving processing, the immediate execution command is received, even if the execution command has not yet been received in the execution receiving processing, the computer causes the image forming apparatus to perform the print processing.

12. The non-transitory recording medium according to claim 10, wherein the computer causes the image forming apparatus to perform authentication processing of performing, before the print command is received in the receiving processing, authentication on the user who attempts to log into the image forming apparatus, when the authentication is performed successfully in the authentication processing, the informing step is not performed, and when the authentication is performed successfully in the authentication processing, the computer causes the image forming apparatus to perform the print processing even if the execution command has not yet been received in the execution receiving processing.

13. The non-transitory recording medium according to claim 8, wherein the computer causes the image forming apparatus to perform cancel processing of canceling the print command when the print command has not yet been executed after a predetermined amount of time has elapsed since the receiver received the print command.

14. The image forming apparatus according to claim 1, wherein the terminal is a mobile terminal.

\* \* \* \* \*